(12) United States Patent
Zhang et al.

(10) Patent No.: US 11,295,060 B2
(45) Date of Patent: Apr. 5, 2022

(54) MANAGING COMMENTS ON BINARY FILES PREVIEW VIEW IN A CLOUD-BASED ENVIRONMENT

(71) Applicant: GOOGLE LLC, Mountain View, CA (US)

(72) Inventors: Eric Zhang, Jersey City, NJ (US); Ryan Weber, New York, NY (US); Birkan Icacan, New York, NY (US); Harold Kim, Forest Lodge (AU); Jameslevi Schmidt, Wayne, NJ (US); James Watts, New York, NY (US); Joshua Bergstrand, Lafayette, CO (US); Xiaojie Jiang, Philadelphia, PA (US); Lai Kwan Wong, New York, NY (US); Cayden Meyer, Pyrmont (AU); Sebastian Doerner, Brooklyn, NY (US); Yifan Cao, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/839,803

(22) Filed: Dec. 12, 2017

(65) Prior Publication Data
US 2019/0179876 A1    Jun. 13, 2019

(51) Int. Cl.
*G06F 3/0483* (2013.01)
*G06F 40/106* (2020.01)
(Continued)

(52) U.S. Cl.
CPC .......... *G06F 40/106* (2020.01); *G06F 3/0483* (2013.01); *G06F 16/1794* (2019.01);
(Continued)

(58) Field of Classification Search
CPC .. G06F 17/212; G06F 16/1873; G06F 40/106; G06F 16/1794; G06F 40/169; G06F 40/151; G06F 3/0483; H04L 65/403
See application file for complete search history.

(56) References Cited

U.S. PATENT DOCUMENTS 8,996,985 B1 * 3/2015 Johnston ............... G06F 17/241
715/230
9,785,637 B2 * 10/2017 Ayyar .................. G06Q 10/101
(Continued)

FOREIGN PATENT DOCUMENTS

EP    2849085 A1    3/2015

OTHER PUBLICATIONS

Anonymous (Jan. 11, 2017). "Working with Comments" retrieved on Feb. 28, 2019. URL:https://docs.microsoft.com/en-us/office/open-xm/working-with-comments.
(Continued)

*Primary Examiner* — Matthew Ell
*Assistant Examiner* — Samuel Shen
(74) *Attorney, Agent, or Firm* — Lowenstein Sandler LLP

(57) ABSTRACT

A method for editing and updating content of a collaborative document within a preview user interface is provided. The method includes a content management platform receives a request for a file stored which is stored in a third-party application format. The system causes a rendered graphical image of the file to be presented within a preview user interface. The rendered graphical image of the file represents a view of the file as if opened within a third-party application. The system receives from the preview user interface, content associated with a portion of the file. The system generates a new version of the file that includes the content associated with the portion of the file.

13 Claims, 9 Drawing Sheets

(51) Int. Cl.
*G06F 16/178* (2019.01)
*G06F 16/18* (2019.01)
*G06F 40/151* (2020.01)
*G06F 40/169* (2020.01)
*H04L 65/403* (2022.01)

(52) U.S. Cl.
CPC ........ *G06F 16/1873* (2019.01); *G06F 40/151* (2020.01); *G06F 40/169* (2020.01); *H04L 65/403* (2013.01)

(56) References Cited

U.S. PATENT DOCUMENTS

| | | | | |
|---|---|---|---|---|
| 9,817,805 | B1* | 11/2017 | Markman | G06F 17/241 |
| 10,042,832 | B1* | 8/2018 | Vagell | G06F 17/241 |
| 2010/0095198 | A1* | 4/2010 | Bultrowicz | G06F 17/241 |
| | | | | 715/234 |
| 2012/0110436 | A1 | 5/2012 | Adler, III et al. | |
| 2013/0198600 | A1 | 8/2013 | Lockhart et al. | |
| 2014/0033015 | A1* | 1/2014 | Shaver | G06F 40/169 |
| | | | | 715/233 |
| 2014/0281872 | A1* | 9/2014 | Glover | G06F 40/194 |
| | | | | 715/229 |
| 2016/0110317 | A1* | 4/2016 | Tashman | G06F 3/0488 |
| | | | | 715/784 |
| 2016/0117289 | A1* | 4/2016 | Pan | G06F 40/169 |
| | | | | 715/230 |
| 2016/0224517 | A1* | 8/2016 | Horn | G06F 17/212 |
| 2018/0024701 | A1* | 1/2018 | Sanches | G06F 40/186 |
| | | | | 715/781 |
| 2018/0349405 | A1* | 12/2018 | Augustine | G06F 16/1767 |

OTHER PUBLICATIONS

PCT Search Report & Written Opinion, RE: Application #PCT/US2018/051226; dated Mar. 14, 2019; 112 pages.
Coakley, et al., "Version-Aware Word Documents", Proceedings of the 2nd International Workshop on (Document) Changes: modeling, detection, storage and visualization, Sep. 16, 2014 (Sep. 16, 2014), pp. 1-4, XP055801308, DOI: 10.1145/2723147.2723152, ISBN: 978-1-4503-2964-4 Retrieved from the Internet: URL:https://dl.acm.org/doi/pdf/10.1145/2723147.2723152.
European Patent Application No. 18829524.0 Office Action dated May 10, 2021, 8 pages.

* cited by examiner

MANAGING COMMENTS ON BINARY FILES PREVIEW VIEW IN A CLOUD-BASED ENVIRONMENT

BACKGROUND

During development of an electronic document, it is often desirable to have multiple reviewers read, comment, and/or edit a draft of the electronic document. For example, an author may create an initial draft of an electronic document and share the electronic document with multiple editors who may concurrently edit (e.g., make changes and/or comments to) the electronic document. The editors may create comments within the electronic document. The comments may be visible within the particular electronic document to the editor who made the comment, other collaborators (e.g., users with whom the electronic document is shared), and/or the author of the electronic document.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to receive, by a content management platform, a request for a file stored within the content management platform. The file may be stored in a third-party application format. The content management platform may cause a rendered graphical image of the file to be presented within a preview user interface on a client device. The rendered graphical image of the file may represent a view of the file as if opened within a third-party application. The method may further include the content management platform receiving, from the preview user interface, content associated with a portion of the file. The content management platform may then generate a new version of the file that includes the content associated with the portion of the file, where the new version of the file is stored in the third-party application format.

In some implementations, the third-party application format may include, but are not limited to, a word processing application format (e.g., Microsoft® Word®, Markdown text, plain text, rich text format, email draft formats, and any other formatted text), a spreadsheet application format (e.g. Microsoft Excel®), a slide presentation application format (e.g. Microsoft PowerPoint®), a drawings presentation application format (e.g. Microsoft Visio®, Portable Document Format (PDF)), a graphics file format, video files, 3D rendered files, computer-aided design (CAD) rendered files, or any other third party file format.

In some implementations, causing the rendered graphical image of the file to be presented within the preview user interface on the client device includes generating one or more rendered images of a plurality of bytes from the file based upon one or more rules associated with the third-party application format. Generation of the rendered graphical image of the file is performed using the one or more rendered images of the plurality of bytes. The rendered graphical image of the file may be provided to the client device for presentation within the preview user interface.

In some implementations, the preview user interface on the client device allows a user of the client device to perform one or more actions of: highlighting text displayed with the rendered graphical image, highlighting a portion of the rendered graphical image using positional coordinates, creating a new comment associated with a portion of the rendered graphical image, and editing existing comments displayed within the preview user interface for the file.

In some implementations, the content management platform, upon receiving the request for the file stored within the content management platform, may extract data representing one or more comments from the file. The content management platform may generate one or more content objects that represent the one or more comments from the file. The content management platform may generate one or more rendered images that represent the one or more content objects which may be provided to the client device with the rendered graphical image of the file for presentation within the preview user interface.

In some implementations, the one or more rendered images that represent the one or more content objects are associated with one or more portions of the rendered graphical image.

In some implementations, when the content management platform receives the content associated with the portion of the file, the content management platform may generate a content object containing the content received. The content management platform may then associate the content object to the portion of the file based upon positional coordinates of the portion of the file within the rendered graphical image of the file.

In some implementations, generation of a new version of the file that includes content associated with the portion of the file may include the content management platform retrieving a plurality of bytes from the file that correspond to the portion corresponding to the content. The content management platform may then generate one or more new bytes representing the content associated with the portion wherein the one or more new bytes are formatted based upon the third-party application format. The content management platform may generate the new version of the file that includes the plurality of bytes from the file and the one or more new bytes that represent the content associated with the portion corresponding to the received content.

In some implementations, the content management platform may receive a request to store a second version of the file, where the second version of the file contains updated content (e.g. new/updated comments). The content management platform may then extract the new content from the second version of the file and merge the new content with existing content from the currently stored version of the file. The content management platform may then store the second version of the file and the merged content within the content management platform.

In some implementations, the content management platform may receive a request to preview the second version of the file stored within the content management platform. The content management platform may generate a rendered graphical image of the second version of the file and may provide the rendered graphical image of the second version of the file to the preview user interface of the client device. The rendered graphical image of the second version of the file may also include rendered images of the new content.

Some implementations may include a method to receive, by a client device, a request for a file stored within the content management platform in a third-party application format. The client device may present a rendered graphical image of the file within a preview user interface. The rendered graphical image of the file may represent a view of the file as if opened within the third-party application. The method may further include receiving, via the preview user interface, content associated with a portion of the file. The client device may provide to the content management platform the content associated with the portion of the file to cause a new version of the file to be created, the new version of the file including the content associated with the portion of the file and the content being in the third-party application format.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
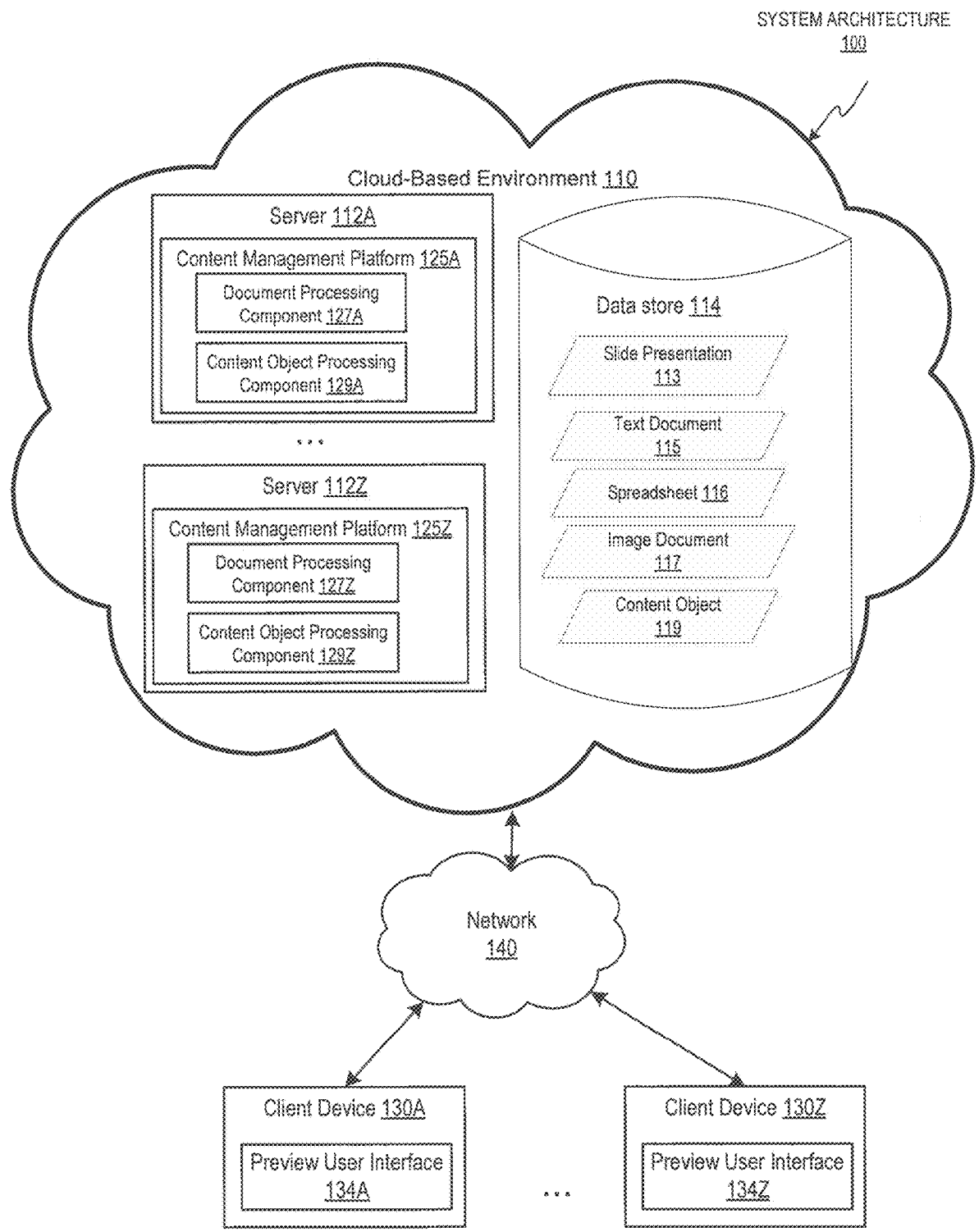
FIG. 1 illustrates an example of a system architecture for implementations of the present disclosure.

Cloud-based content management platforms may provide file storage and synchronization services, among other things. For example, a cloud-based content management platform may enable a user to store files on one or more servers in a cloud-based environment, synchronize the files across various devices of a user, and share the files with one or more other users. In some instances, the cloud-based content management platform may provide a single location to manage the files for the user. The files may include electronic documents stored in various file formats such as, Microsoft Office (Word, Excel, PowerPoint, and OneNote), PDF, image file formats, audio file formats, video file, 3D rendered file, CAD rendered file, or any other third-party application format.

An electronic document refers to media content used in electronic form. Media content may include text, tables, videos, audio, images, graphs, slides, charts, software programming code, designs, lists, plans, blueprints, maps, etc. The cloud-based content management platform may enable an author of an electronic document to invite other users to join as collaborators with respect to the electronic document stored in the cloud-based environment. An electronic document to which users have been granted permission to access and/or edit concurrently may be referred to as a collaborative document herein. A collaborator may refer to a user who is able to perform operations related to (e.g., viewing, editing, commenting on, etc.) a collaborative document together with one or more other users.

The collaborative document may be accessible by collaborators via the cloud-based content management platform hosted by one or more servers in the cloud-based environment. Each collaborator may view the collaborative document at a user's client device within a preview user interface provided by the content management platform or using a third-party application compatible with the file format of the collaborative document. For example, a user may preview the collaborative document through a web browser on their client device using a website associated with the cloud-based content management platform or in a UI of a third-party application installed on the client device.

Conventionally, in order for collaborators to provide feedback, such as comments, to the collaborative document, the collaborators would download the collaborative document to the client device and then open the collaborative document within a third-party application capable of editing the collaborative document. For example, if the collaborative document is a Microsoft Word document, then the user may download the collaborative document to their client device and then open the collaborative document for editing within a third-party application such as Microsoft Word. Therefore, in order for collaborators to modify or add comments within a collaborative document, the collaborators would have to launch a third-party application capable of natively opening the collaborative document. If however, a collaborator's device does not have a third-party application capable of natively opening the collaborative document or does not have the requisite third-party application license, then the collaborator would be unable to add comments or annotations within the collaborative document itself.

Additionally, the process of adding comments or annotations within the collaborative document typically requires a collaborator to download the collaborative document, locally edit the document within the third-party application, generate a new version of the collaborative document, and upload the new version of the collaborative document to the cloud-based content management platform. However, if several collaborators provide comments or annotations to the collaborative document, then this process of locally editing and uploading new versions of the collaborative document may result in multiple different versions of the collaborative document being circulated concurrently. Having multiple different versions of the collaborative document in circulation may cause conflicts between multiple versions of the collaborative document and may lead to comments being lost or overwritten if versions of the collaborative document are not correctly reconciled.

Aspects of the present disclosure address at least these deficiencies, among others, by enabling content input within the preview user interface provided by the cloud-based content management platform. The preview user interface may allow multiple collaborators to provide input within the preview user interface displayed on their corresponding client devices. From the preview user interface, each collaborator would be able to add or edit content (e.g. comments and/or annotations) within the collaborative document without the need of having a third-party application on the client device and opening the document in the third-party application on the client device. In particular, the cloud-based content management platform may parse the existing document, extract specific data objects, such as objects containing comments, from the existing document and provide the preview user interface including the comments. Collaborators may interact with the displayed comments by editing the displayed comments or adding new comments within the preview user interface. The cloud-based content management platform may receive the comments via the preview user interface and convert these comments into document compatible data objects which then may be merged with the existing version of the document to generate a new version of the document that includes the updated and newly created comments from the preview user interface.

According to some aspects of the present disclosure, the cloud-based content management platform generates and maintains content objects for collaborative documents stored within the cloud-based environment. Content objects may represent specific data objects extracted from collaborative documents. The extracted data objects may include, but are not limited to, data objects representing comments, annotations, highlights, fillable data fields, cells, or any other specific data types within the electronic document. For example, a text document may contain a set of comments referring to edits or notes within the collaborative document. The content management platform may extract the set of comments from the collaborative document and create a set of content objects that each represent a comment from the collaborative document. Each content object, for example, may contain data from the extracted data object including text from the comment, the author of the comment, a timestamp associated with the comment, positional information describing a portion in the collaborative document that is associated with the comment, and any other attributes pertaining to the comment extracted from the collaborative document. As described, content objects are not limited to representing comments. Even though described examples may refer to data objects from collaborative documents and generated content objects as representing comments within a document, content objects may represent any defined attribute or object from a collaborative document.

According to some aspects of the present disclosure, the preview interface may display graphical representations the set of content objects with the graphical representation of the electronic document. The preview user interface may allow a user to interact with the set of content objects such that a user may edit content within the content objects. For example, a user may change the comment text displayed within a content object as if the user is editing the comment within a third-party application. Additionally, the preview user interface may be configured to allow a user to provide a new comment or other input. For example, a user may select a portion of the collaborative document and create a new comment associated with the portion. The content management platform may receive the new comment and information identifying the selected portion of the collaborative document, and create a new content object that contains the text of the new comment, a user identifier identifying the user who created the comment, a timestamp of when the comment was created, and positional information identifying the portion of the document that was selected when the comment was created. As such, the content management platform may receive, from the client device, content that represents user input (e.g. edits or new content) and may update an existing content object or generate a new content object that is inserted into the set of content objects associated with the current collaborative document.

According to some aspects of the present disclosure, the content management platform may generate a new version of the collaborative document that includes the new/updated content objects from the preview user interface. The content management platform may convert the set of content objects into data objects that are compatible with the third-party file format associated with the collaborative document. For example, if the electronic document is a Microsoft Word document, which contains OpenXML data objects, then the content management platform may convert the set of content objects into OpenXML data objects so that the converted set of content object may be merged into the collaborative document. The content management platform may be configured to generate a new version of the collaborative document that contains the set of content objects. The new version of the collaborative document may then be stored within the cloud-based environment where other collaborators may view and/or edit the new version of the collaborative document. Additionally, collaborators who may download and open the collaborative document locally may be able to view the new/updated data objects within a third-party application. For example, if the collaborative document is a Microsoft Word document and the new version of the electronic document contains additional comments, then a collaborator may view the additional comments within a third-party application, such as Microsoft Word, because the new comments generated in the preview user interface were converted and merged into the new collaborative document as new OpenXML data objects, which the third-party application may recognize and display.

According to some aspects of the present disclosure, the content management platform may maintain a consistent set of content objects representing the extracted data objects from different versions of the collaborative document. The content management platform may inspect data objects extracted from a new or different version of a collaborative document and compare the data objects to the existing set of content objects maintained by the content management platform. The content management platform may implement deduplication techniques by identifying duplicate comments based upon one or more object attributes. For example, if the data objects from the collaborative document are comments, then the content management system may identify duplicate objects by matching data objects to existing content objects based upon comment text, author, timestamp, positional information, and any other unique attribute that may be used to uniquely identify comments.

Some benefits of the enabling content input within the preview user interface of the present disclosure may provide a technical effect caused by and/or resulting from a technical solution to a technical problem. For example, one technical problem may relate to inefficient and/or over consumption of resources (e.g., processing, memory) by managing multiple versions of a collaborative file produced by multiple collaborators using third-party standalone applications to provide input. One of the technical solutions to the technical problem may include enabling specific input within a centralized preview user interface. A technical effect that may result from and/or be caused by the technical solution to the technical problem may include enhancing processing speed and reducing memory consumption by managing inputted content included in a collaborative document in a single user interface without each collaborator having to open a separate third-party application to input comments and/or other data in the collaborative document. Also, aggregating and displaying the comments in the single user interface may enable multiple collaborators to view comments from other collaborators more effectively and efficiently. In addition, as discussed, conventional solutions have multiple versions of the collaborative document with different comments in circulation, causing conflicts between the versions and leading to comments being lost or overwritten if versions of the collaborative document are not correctly reconciled. Aspects of the present disclosure solve this problem by allowing multiple comments to be provided via the preview interfaces on user devices, aggregating and converting these comments, and incorporating them into a single version of the collaborative document, thereby preventing comments from being lost or overwritten.

FIG. 1 illustrates example system architecture 100 for implementations of the present disclosure. The system architecture 100 includes a cloud-based environment 110 connected to client devices 130A-130Z via a network 140. A cloud-based environment 110 refers to a collection of physical machines that host applications providing one or more services (e.g., content management) to multiple client devices 130 via a network 140. The network 140 may be public networks (e.g., the Internet), private networks (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

The cloud-based environment 110 may include one or more servers 130A-130Z and a data store 114. The data store 114 may be separate from the servers 130A-130Z and communicatively coupled to the servers 130A-130Z or the data store 114 may be part of one or more of the servers 130A-130Z. In some embodiments, the data store 114 may be included as part of the client devices 130A-130Z. The data store 114 may store various collaborative documents, such as a collaborative slide presentation 113, a collaborative text document 115, a collaborative spreadsheet 116, a collaborative image document 117, or any suitable collaborative document (e.g., an collaborative document including text, tables, videos, images, graphs, slides, charts, software programming code, designs, lists, plans, blueprints, maps, etc.) that can be shared with users and/or concurrently editable by users. The term "concurrently editable" may refer to users concurrently modifying (e.g., adding, deleting, changing, etc.) content (e.g., text, cells, images, data, slides, etc.), concurrently suggesting changes to the content, concurrently making comments on the content, and the like. The data store 114 may also store one or more content objects 119 extracted from the collaborative documents and/or created within the preview user interface.

The collaborative documents may be created by an author and the author may share the collaborative documents with other users (e.g., collaborators). Sharing the collaborative documents may refer to granting permission to the other users to access the collaborative documents. Sharing the collaborative documents may include informing the other users of the collaborative documents via a message (e.g., email) including a link to the collaborative documents. The level of permissions that each user is granted may be based on the user type of each particular user. For example, a user with an editor user type may be able to open the collaborative documents and make changes directly to the collaborative documents. Further, an editor user type may be allowed to input content into the preview user interface of a client device causing a content object 119 to be created that includes the input content.

When content objects 119 are created in the preview user interface for an collaborative document, the content objects 119 may be associated with the user that caused the content object 119 to be created (e.g., directly via selecting an indicator representing adding a comment to the collaborative document, or indirectly when a user is replying to an existing comment or assigning a comment to another user), and one or more other users. For example, a collaborative document may be created by an author and shared with another user that has a reviewer user type. The reviewer may open the collaborative document and cause a content object 119 to be created in the collaborative document. The content object 119 may be associated with the user ID of the reviewer and the user ID of the author. In some instances, the creator of the content object 119 may assign the content object 119 to a particular user. Accordingly, when the user causes the content object 119 to be assigned to another user, the assignee user (e.g., the user to which the comment was assigned) may also become associated with the content object 119.

The created content object 119 may be stored in the data store 114 as part of the collaborative document in which the content object 119 was created or as its own data entry in a separate data structure in the data store 114. Various attributes may be associated with the content object 119 during storage, such as a user ID of the user creating the content object 119, an owner ID of the user that owns the collaborative document, body text of the content object 119 (can contain links), assignment flag that enables assigning tasks to other collaborators, other user IDs of users associated with the comment, a flag indicating whether the comment is resolved or not (this flag may toggle from resolved to not resolved if a user reopens a resolved comment), a timestamp when the content object 119 was created, a flag indicating whether the content object 119 includes or is associated with a suggestion, a project ID of the project with which the collaborative document including the content object 119 is associated, a team ID of the team with which the user that created the content object 119 is associated, positional information associating the content object 119 to a portion of the collaborative document, and any other descriptive attributes.

The servers 130A-130Z may be physical machines (e.g., server machines, desktop computers, etc.) that each include one or more processing devices communicatively coupled to memory devices and input/output (I/O) devices. The servers 130A-130Z may host a content management platform (125A-125Z). The content management platform 125 may be implemented as computer instructions that are executable by one or more processing devices on each of the servers 130A-130Z. In alternative implementations, the content management platforms 125A-125Z may be installed on the client devices 130A-130Z (e.g., as a standalone application) and operate as peers in a peer-to-peer environment. In yet alternative implementations, applications on the client devices 130A-130Z may interact with the content management platform 125 and may perform some of the functionality of the content management platform 125.

One or more of the servers 130A-130Z may host the content management platform 125A-125Z. The server 130A-130Z selected to host the content management platform 125A-125Z may be based on certain load-balancing techniques, service level agreements, performance indicators, or the like. It should be understood that the servers 130A-130Z of the cloud-based environment 110 host the content management platforms 125A-125Z, and thus, the content manage platforms 125A-125Z may be referred to as cloud-based content management platforms 122A-122Z herein.

The content management platform 125A-125Z may enable a user to view and/or manage collaborative documents, with which they are associated, within a respective preview user interface 134A-134Z. Additionally, in some embodiments, the cloud-based content management platform 125A-125Z may provide a preview user interface 134A-134Z that displays content objects 119 associated with the collaborative documents created by the user or associated with the user in the respective preview user interface 134A-134Z.

The content management platform 125A-125Z may also enable users using different client devices 130A-130Z to concurrently access the collaborative document (113, 115, or 116) to comment on, edit (e.g., modify or suggest changes), and/or view the collaborative document in the preview user interface 134A-134Z. In an implementation, the preview user interfaces 134A-134Z of the content management platform 125A-125Z may be web pages rendered by a web browser and displayed on the client device 130A-130Z in a web browser window. In another implementation, the preview user interfaces 134A-134Z may be displayed by a mobile application or a desktop application. For example, the preview user interfaces 134A-134Z may be displayed by a native application executing on the client device 130A-130Z. The native application may be separate from a web browser.

In an implementation the content management platform 125A-125Z may include a document processing component 127A-127Z and a content object processing component 129A-129Z. The document processing component 127A-127Z may be configured to process bytes data objects contained in a collaborative document and store the processed bytes within the data store 114. The document processing component 127A-127Z may then convert the stored bytes into one or more rendered images that provide graphical representations of data objects from the collaborative document. For example, if the collaborative document is a PDF file containing text, graphs, and pictures, then the document processing component 127A may convert the stored bytes of the PDF file into rendered images that represent different parts of the file, such as text images for different characters, words, lines, or paragraphs, and graphical images representing the different graphs and pictures within the PDF file. The document processing component 127A may format and arrange the different rendered images into a form that provides a graphical display of the collaborative document as it would look as if opened within a third-party application using the third-party application format. For example, the document processing component 127A may format and arrange the graphical representations of the different objects of the PDF file to generate a graphical representation of the PDF file that looks as if the PDF file were opened within a PDF compatible application.

In an implementation the content object processing component 129A-129Z can extract data objects from the collaborative document and create a set of content objects 119 that represent the data objects extracted. For example if the content object processing component 129A extracted data objects representing comments within a Microsoft Word document, then the set of content objects 119 would each represent a comment from the Microsoft Word document. The content object processing component 129A-129Z can store the set of content objects 119 within the data store 114. The content object processing component 129A-129Z can further compare and update a set of content objects 119 associated with a collaborative document when the content management system 125A-125Z receives and stores a new version of the collaborative document. For example, if a user uploads a new version of a collaborative document to the cloud-based environment 110, then the content object processing component 129A may extract data objects referring to comments from the new version of the collaborative document and compare the data objects from the new version to the existing set of content objects 119 associated with the previous version of the collaborative document.

The client devices 130A-130Z may include one or more processing devices communicatively coupled to memory devices and I/O devices. The client devices 130A-130Z may be desktop computers, laptop computers, tablet computers, mobile phones (e.g., smartphones), or any suitable computing device. As discussed above, the client devices 130A-130Z may each include a web browser and/or a client application (e.g., a mobile application or a desktop application). A user that is invited and becomes a collaborator of the collaborative document may request to access the collaborative document via the web browser or the client application. For example, the user may select the collaborative document from the preview user interface 134A provided by the content management platform 125A and presented by the web browser or the client application. As such, the client device 130A associated with the user may request the collaborative document from the cloud-based environment 110.

Figure 2:
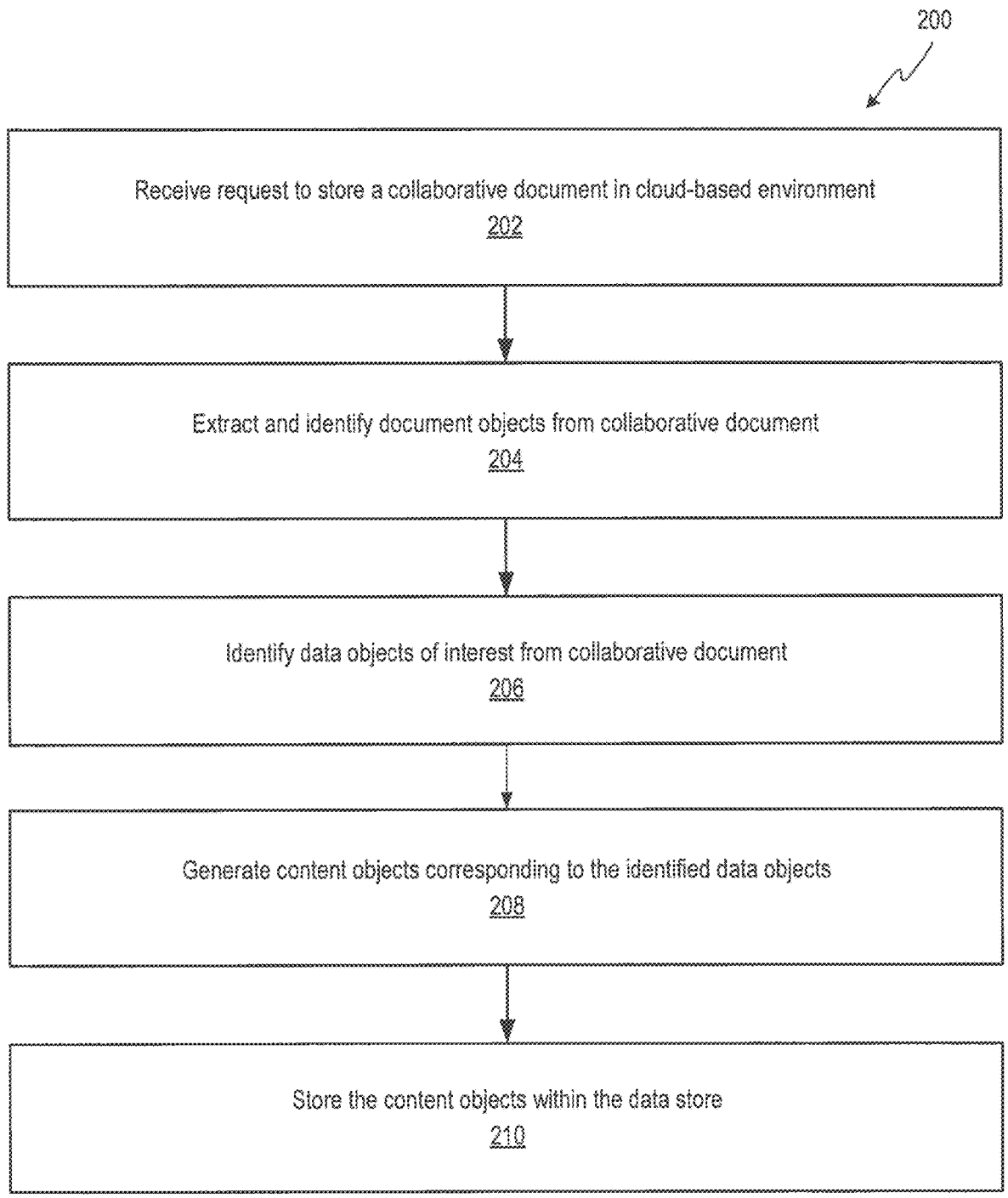
FIG. 2 depicts a flow diagram of a method for receiving and storing a collaborative document within a cloud-based environment, in accordance with one implementation of the disclosure.

FIG. 2 depicts a flow diagram of a method 200 for receiving and storing a collaborative document within the cloud-based environment 110, according to some implementations. Although the content management platform 125A is used for discussion of method 200, it should be understood that any other content management platform 125B-125Z may be used, instead of or in addition to the content management platform 125A, to receive and store the collaborative documents. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by the content management platform 125A. Alternatively, at least some operations of method 200 can be performed by a client application executed by one or more processing devices of the client devices 130A-130Z.

At block 202, the processing device may receive a user request to store a collaborative document within the cloud-based environment 110. In an embodiment, the user request may be generated and sent from client device 130A. For example, a web browser or any other application configured to communicate with the content management platform 125A may generate and send a user request to store the collaborative document. The user request may include the collaborative document itself, information identifying the owner of the document, potential collaborators that may be given permission to make comments and/or edits to the collaborative document. As discussed previously, the collaborative document may be any type of third-party formatted file such as a text document, slide presentation, spreadsheet, an image file, or any other collaborative document.

At block 204, the processing device may extract and identify document objects from the collaborative document in the data store 114. In an embodiment, the document processing component 127A of the content management platform 125A may extract the bytes from the collaborative document and identify one or more document objects that make up the collaborative document. Document objects may refer to any defined objects within the collaborative document include, such as characters, words, lines, paragraphs, tables, cells, images, fonts, embedded pictures, or any other document specific objects. The one or more document objects may be identified using configured rules based upon the third-party application format of the collaborative document. For example, if the collaborative document is stored in a Microsoft Excel spreadsheet format, then the document processing component 127A may use rules that define the structure of objects within a Microsoft Excel spreadsheet to identify the one or more document objects within the collaborative document. Rules for different third-party file formats may be derived from different third-party application libraries such as those available via application programming interfaces (APIs).

In an embodiment, after identifying the document objects the document processing component 127A may format and store the document objects along with the collaborative document in the data store 114. For example, if a collaborative document is a Microsoft Excel spreadsheet, the document processing component 127A may store the collaborative document along with the extracted objects as collaborative spreadsheet 116.

At block 206, the processing device may identify specific data objects within the collaborative document for processing to generate one or more content objects to be associated with the collaborative documents. The specific data objects may include data objects that represent comments, annotations, text fields or any other specific attribute from the collaborative document. In an embodiment, the content object processing component 129A may identify and extract, from the bytes of the collaborative document, one or more data objects that specify comments, annotations, text fields, or any other attribute of interest. The type of data object identified by the document processing component 127A may be specified within the storage request from the client device 130A or may be identified based upon the third-party application format of the collaborative document. For example, if the collaborative document is a Microsoft Word file type, then the document processing component 127A may identify and extract data objects that refer to comments within the Microsoft Word file. The document processing component 127A may use rules specific to the third-party application format to identify the data objects. In an embodiment, the content object processing component 129A may identify different types of data objects.

At block 208, the processing device may generate one or more content objects 119 corresponding to the identified data objects from the collaborative document. In an embodiment, the content object processing component 129A may generate a content object 119 that includes each of the attributes from the identified data object. For example, if the data object identified is a comment, then the content object 119 may include the text within the comment, a user ID of the user that originally created the comment, a timestamp associated with the comment, an anchor to a portion of the collaborative document that the comment is associated with, or any other third-party application comment attribute. In another example, if the data object identified is a text field within a PDF collaborative document, then the content object 119 may include positional information related to the position of the text field, any existing text within the text field, formatting information for the text field, and any other attributes.

At block 210, the processing device may store the created content objects 119 within the data store 114. In an embodiment, the content object processing component 129A stores the one or more content objects 119 within the data store and associates the one or more content objects 119 with the stored collaborative document within the data store 114. This association allows the content management platform 125A to retrieve relevant content objects 119 along with the collaborative document when requested. For example, the associated content objects 119 may be presented along with a representation of the collaborative document within the preview user interface 134A of the client device 130A.

Figure 3A:
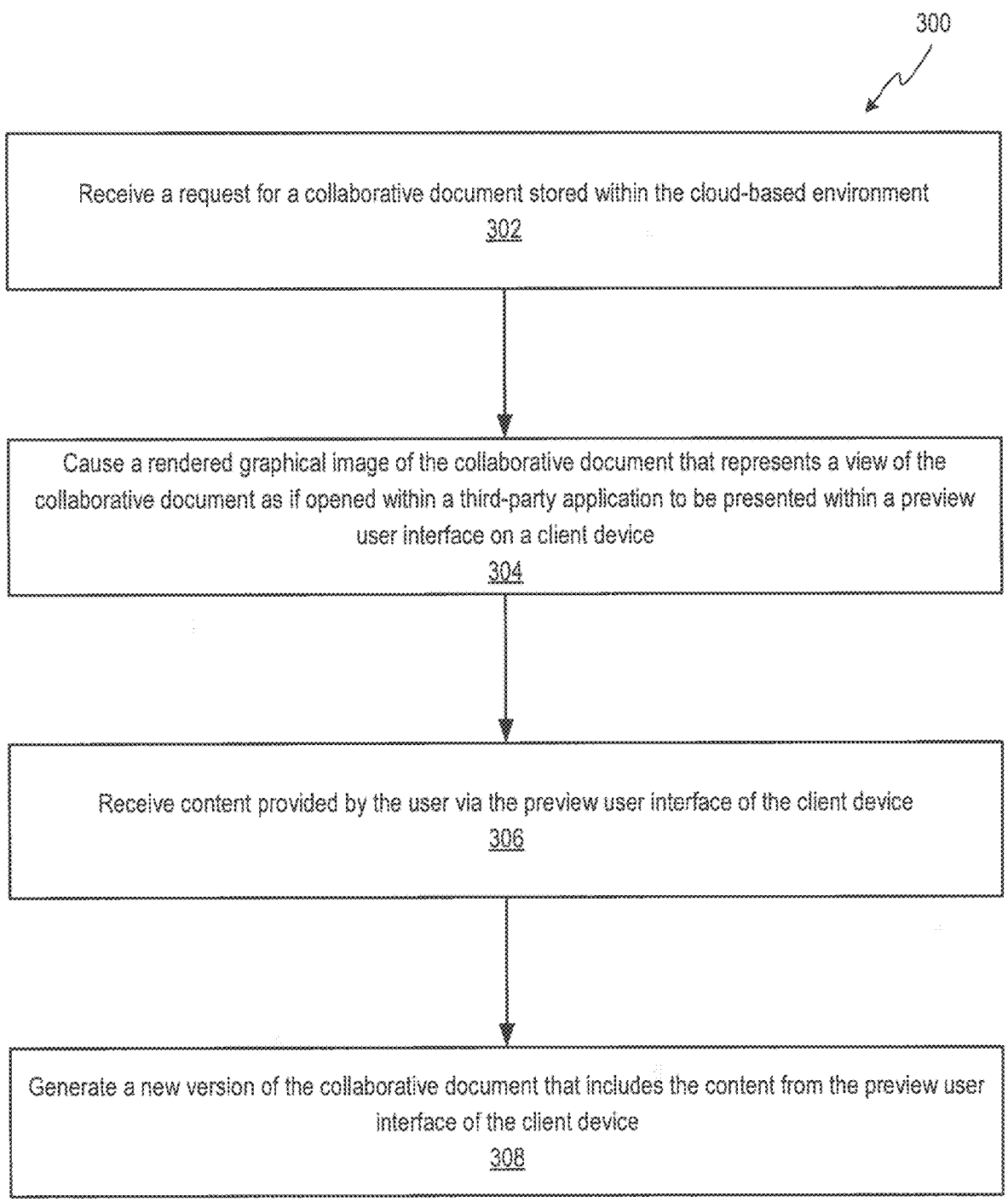
FIG. 3A depicts a flow diagram of a method for providing a preview interface to display a preview of a requested collaborative document and receive content input from a user, and generating a new version of the collaborative document including the content input from the user, in accordance with one implementation of the disclosure.

FIG. 3A depicts a flow diagram of a method 300 for providing a preview user interface 134A to display a set of content objects 119 associated with a collaborative document and receive content input from a user, and generating a new version of the collaborative document including the content input from the user, according to some implementations. In one implementation, method 300 may be performed by the content management platform 125A.

At block 302, the processing device may receive a user request for a collaborative document stored within the cloud-based environment 110. The file may represent any stored document including, but not limited to, collaborative slide presentation(s) 113, collaborative text document(s) 115, collaborative spreadsheet(s) 116, collaborative image document 117, or any other collaborative document stored within the data store 114 in a third-party application format. In an embodiment, the received user request may be generated and sent from client device 130A. The request may be generated within the preview user interface 134A or any other user interface or application configured to communicate with the content management platform 125A.

At block 304, the processing device may cause a rendered graphical image of the collaborative document, which represents a view of the collaborative document as if opened within a third-party application, to be presented within the preview user interface 134A on a client device 130A. In an implementation, the processing device may generate a rendered graphical image of the collaborate document that represents a view of the collaborative document as if opened within a third-party application. In an embodiment, the document processing component 127A may retrieve the one or more stored document objects from the data store 114 and generate one or more graphical representations of the document objects. The one or more graphical representations may be formatted to look like graphical representations of the document objects as they would appear within the third-party application associated with the collaborative document. For example, if the collaborative document is a Microsoft Word document, then the one or more stored document objects would be rendered to look like the objects within the Microsoft Word application. The document processing component 127A may use rendering rules based upon libraries and other APIs associated with the third-party application format to determine what each of the rendered objects should look like. For instance the rendering rules may define what text in Times New Roman font should look like for Microsoft Word application.

In an implementation, the content object processing component 129A may retrieve the stored content objects 119 associated with the requested collaborative document and generate one or more graphical representations of the content objects 119. The graphical representations of the content objects 119 may be generated to look like the objects as the objects would appear in the associated third-party application of the collaborative document. For example, if the content objects 119 are Microsoft Word comments, then the graphical representations may look like Microsoft Word comments and may have rendered graphical anchors or other connecting lines to graphical representations of document objects of the collaborative document. For example, if a comment is associated with the first paragraph within the collaborative document, then the rendered graphical image of the comment may include an anchor or connecting line to the graphical representation of the first paragraph of the collaborative document.

In an implementation, content management platform 125A may combine the graphical representations of document objects and the graphical representations of content object 119 to generate a rendered graphical image of the collaborative document for viewing within the preview user interface 134A.

In an implementation, the processing device may provide the preview user interface 134A including the rendered graphical image of the collaborative document to client device 130A for presentation or cause the preview user interface 134A to be updated to include the rendered graphical image of the collaborative document. In an embodiment, the content management platform 125A sends the rendered graphical image of the collaborative document, including the graphical representations of the associated content objects 119 to the preview user interface 134A via network 140. The preview user interface 134A may present the rendered graphical image of the collaborative document to a user of the client device 130A. In other implementations, the client device 130A may be configured to process data representing the collaborative document, in order to generate the rendered graphical image and present the rendered graphical image within the preview user interface 134A. Implementations of the client device 130A performing generation of the rendered graphical image are discussed in more detail below in conjunction with FIG. 3B.

Figure 4:
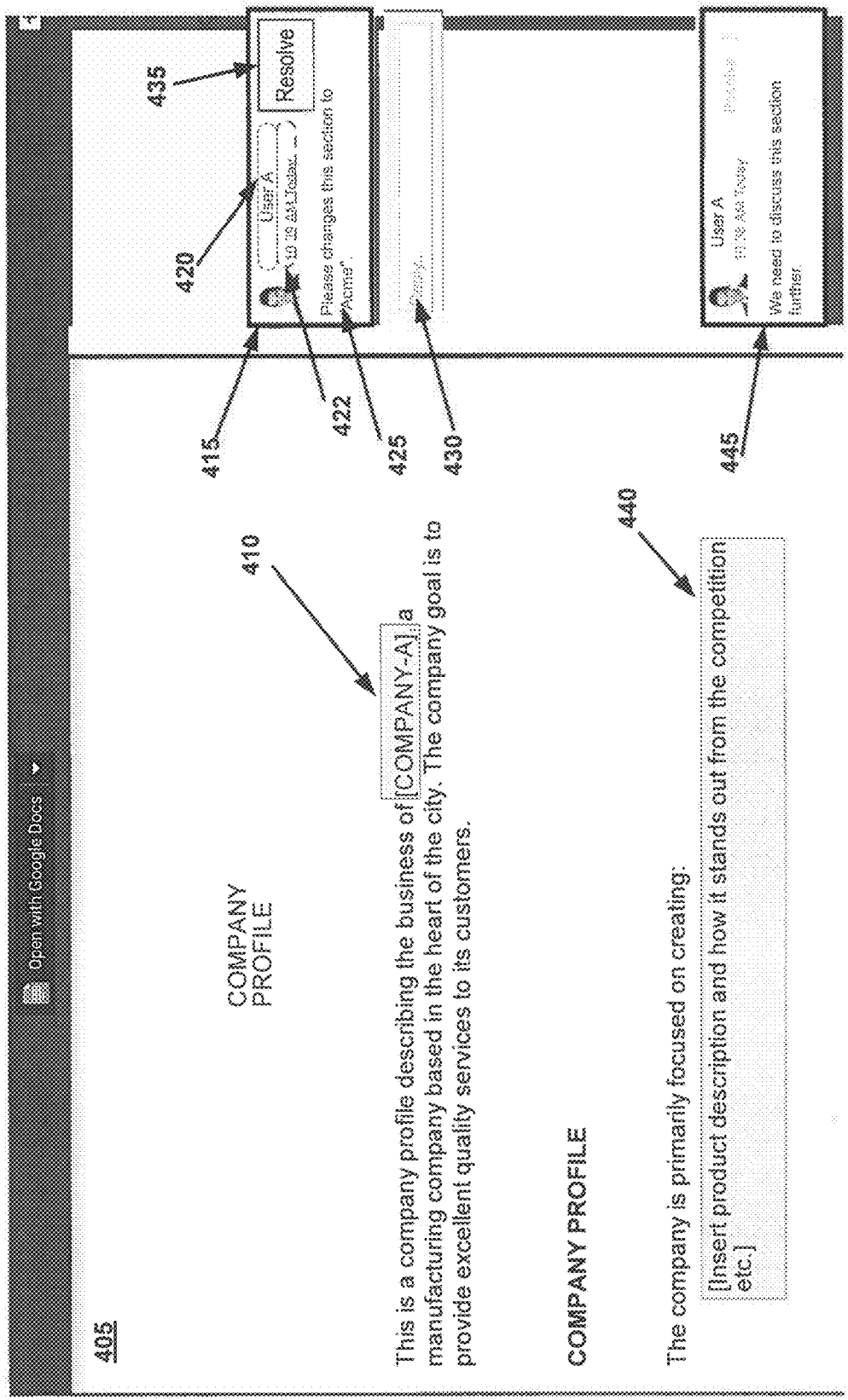
FIG. 4 illustrates an example of a rendered graphical image of a collaborative document within a preview user interface, in accordance with one implementation of the disclosure.

FIG. 4 depicts an example of a rendered graphical image of a collaborative document within the preview user interface 134A. Preview document 405 may represent the rendered graphical image of the collaborative document. For example, the collaborative document may be a Microsoft Word formatted document and preview document 405 may have been rendered by the content management platform 125A to look like a Microsoft Word document. By making the preview document 405 look like a Microsoft Word document, a collaborator may be able accurately view the collaborative document and provide feedback in the form of a comment or other annotation within the preview user interface 134A. Comment 415 is a graphical representation of content object 119, which represents a comment from the collaborative document. Comment 415 may include user ID 420 that displays the user ID of the collaborator that originally provided the comment. User ID 420 may be an attribute from content object 119. Timestamp 422 may display the timestamp associated with the comment, such as the timestamp of when the comment was originally created or recently modified. Comment text 425 represents the descriptive text from the content object 119. Comment 415 is associated with text portion 410, which may be based upon a positional anchoring or text association attribute within the content object 119. In the current example, the text association attribute for content object 119, may specify that content object 119 is associated with text object "[Party One Name]" in the collaborative document.

Figure 5:
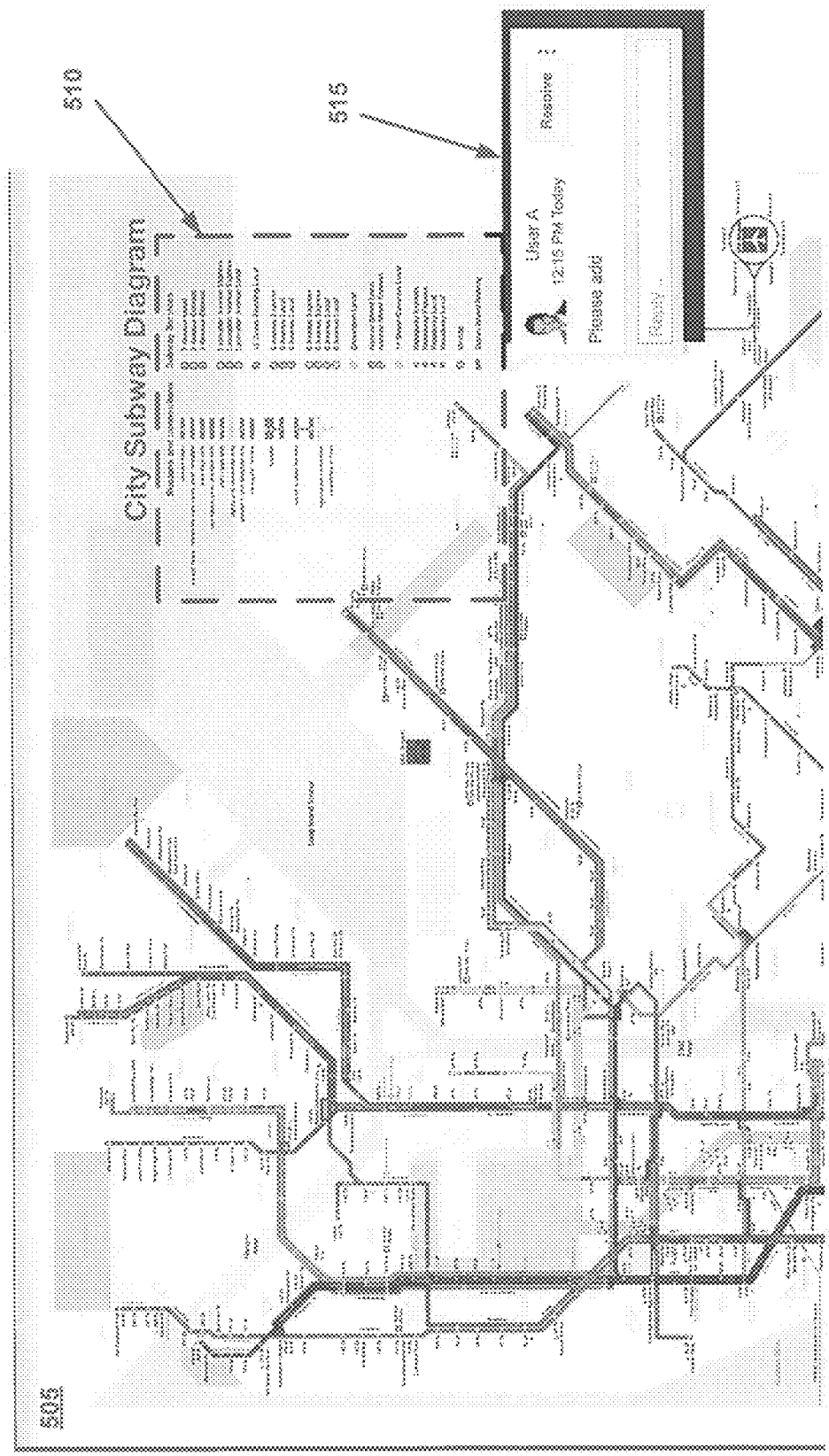
FIG. 5 illustrates an example of a previewed collaborative image document within a preview user interface, in accordance with one implementation of the disclosure.

FIG. 5 depicts another example of a previewed collaborative image document within the preview user interface 134A. Preview document 505 is represented by an image file of a subway system of a particular city. The associated collaborative document may be any type of image file that is compatible with a third-party application image viewer. Comment 515 may represent a comment generated by a user within the preview user interface 134A. Portion 510 represents a selected portion of the preview document 505 that is associated with the comment 515. In this case, the association may be based upon positional coordinates associated with the preview document 505. The positional coordinates for portion 510 refer to the subway diagram legend.

Figure 6:
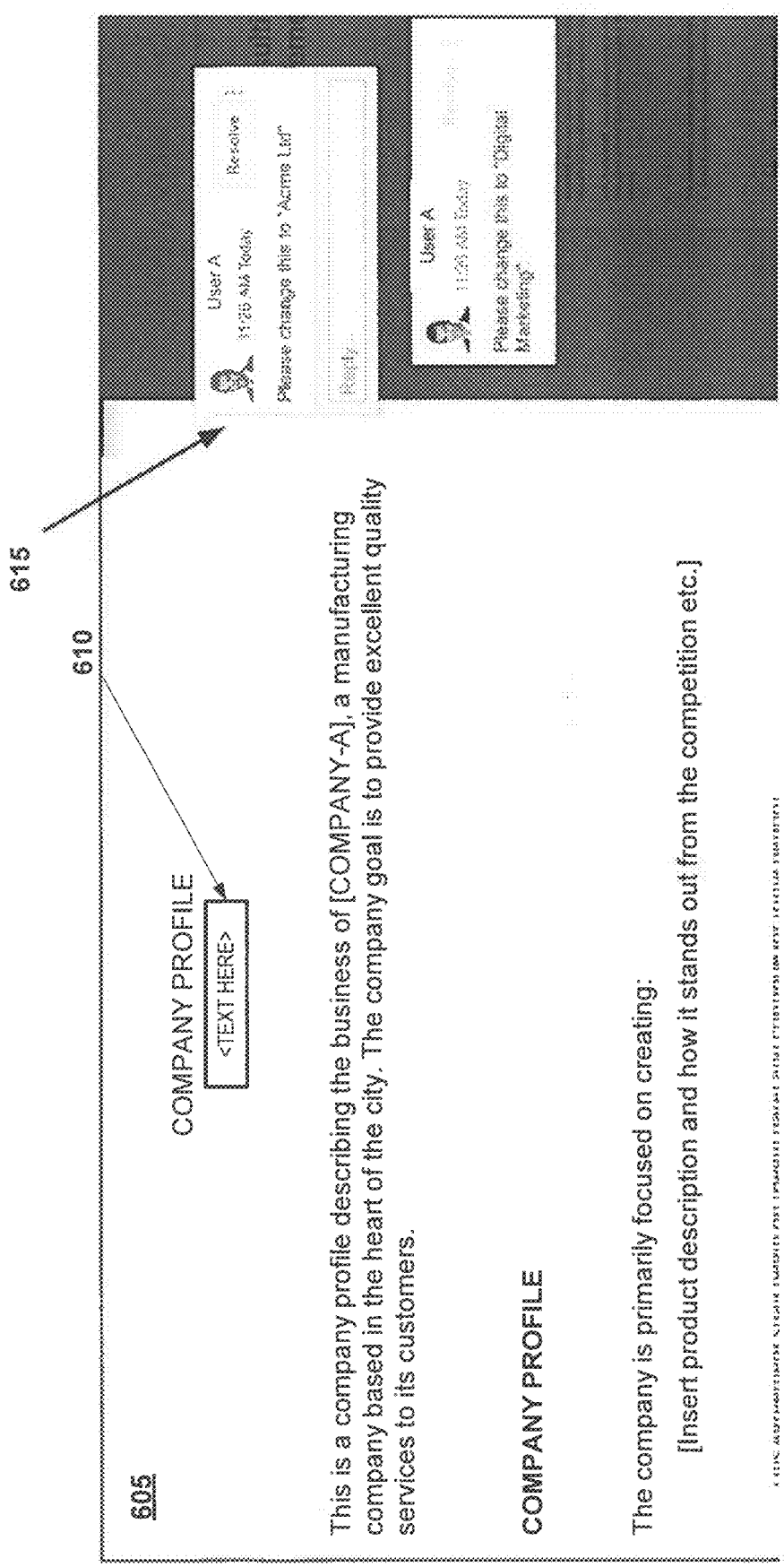
FIG. 6 illustrates an example of a previewed collaborative document within a preview user interface, in accordance with one implementation of the disclosure.

FIG. 6 depicts an example of a previewed collaborative document, which is a PDF document, within the preview user interface 134A. Preview document 605 is represented by a rendered graphical image of a PDF document that may include fillable fields. Fillable field 610 represents a graphical representation of content object 119, which is a fillable field. The preview user interface 134A displays fillable field 610 as a field that the user may interact with. Fillable field 610 may be formatted and displayed based upon attributes of the corresponding content object 119. If the user inputs content within fillable field 610, the preview user interface 134A may display the inputted text either within the fillable field 410 itself or as comment 615 within the margins of the displayed preview document 605.

In an embodiment, the rendered graphical image presented by the preview user interface 134A may allow a user to input content related to the collaborative document and/or displayed content objects 119. For example, a user may be able to create new comments by highlighting text or a portion of the rendered graphical image of the collaborative document. A user may also be able to edit existing comments by adding additional text to a comment as a reply message. Referring back to FIG. 4, text box 430 illustrates an example text box where a user may edit an existing comment by adding additional text in the form of a reply message.

Referring to FIG. 3A, at block 306 the processing device may receive, via the preview user interface 134A, content associated with a portion of the collaborative document. For instance, a user may input content into the existing comment 415 by selecting the resolve button 435 displayed within the comment 415. After selecting the resolve button 435, the user may input text into text box 430 in order to add additional comments to the existing comment 415. In an embodiment, the preview user interface 134A may receive input of the user, at text box 430, and then send the inputted content to the content management platform 125A. The content management platform 125A may then relay the inputted content to the content object processing component 129A, which then may update the content object 119 associated with comment 415. The content object processing component 129A may add the inputted content as additional text with an associated user ID and timestamp to the content object 119.

Another example of content provided by a user may include input to create a new comment. In an embodiment, a user may highlight text or a portion of the rendered graphical image, within the preview user interface 134A, and elect to add a new comment. Referring back to FIG. 4, highlighted text 440 is an example of a user highlighting a portion of the displayed text and creating a new comment 445 within the preview user interface 134A. The preview user interface 134A may send the inputted content to the content management platform 125A. The inputted content, in this example, may include a request to generate a new comment, with the input text as "Please change this to 'Digital Marketing'", the associated collaborator as user B, the timestamp as 11:26 AM, and a positional anchor attribute associated with the highlighted paragraph beginning with "information relating to the Disclosing Party". The content management platform 125A may receive the input request and send the request to the content object processing component 129A. The content object processing component 129A may then generate a new content object 119 that contains the received input request and attributes associated with the requested new comment.

In an embodiment, upon generating new content objects 119 or updating existing content objects 119, the content object processing component 129A may generate an updated rendered graphical images of the set of content objects 119 and notify the content management platform 125A. The content management platform 125A may update the rendered graphical image of the collaborative document to include the updated graphical representations of the set of content objects 119 and send the updated rendered graphical image for presentation in the preview user interface 134A. Additionally, content management platform 125A may send the updated graphical image of the collaborative document for presentation in the preview user interfaces 134B-134Z if any of the preview user interfaces 134B-134Z are currently displaying a preview of the collaborative document. By doing so, the content management platform 125A may be able to push updates to each client device 130A-130Z that is viewing the collaborative document within the preview user interface 134a-134Z.

In another embodiment, the preview user interface 134A may locally update the rendered graphical image of the collaborative document and rendered content items 119 when the user input is sent from the preview user interface 134A to the content management platform 125A (block 308).

Referring back to FIG. 3A, at block 308 the processing device may generate a new version of the collaborative document that includes the received input content from preview user interface 134A (block 308). In an embodiment, upon creating a new content object 119 or updating an existing content object 119, the content management platform 125A may initiate generation of a new version of the collaborative document. The content management platform 125A may request, document objects associated with the currently stored collaborative document from the data store 114 and the updated set of content objects 119 from the document processing component 127A and the content object processing component 129A respectively.

The document processing component 127A may retrieve the set of document objects that make up the currently stored collaborative document from the data store 114. As discussed previously, the data store 114 may contain the collaborative document, as received in the third-party format, and a set of extracted document objects that represents the data objects within the collaborative document. For example, if the collaborative document is a Microsoft Word document, then the Microsoft Word document may be stored as text document 115 within the data store 114. In an embodiment, the document processing component 127A may send the retrieved set of document objects to the content management platform 125A. The retrieved set of document objects may be used by the content management platform 125A to generate a new version of the collaborative document along with the updated set of content objects.

The content object processing component 129A may retrieve the updated set of content objects 119 from the data store 114. In an embodiment, the content object processing component 129A may format the updated set of content objects 119 into third-party application compatible objects. For example, if the collaborative document is a Microsoft Word document, then the content object processing component 129A may use stored libraries, such as Microsoft Word APIs or OpenXML APIs libraries, to generate Microsoft Word compatible objects such as OpenXML elements that represent each of the comments and/or annotations represented by the updated set of content objects 119. The content object processing component 129A may then send the third-party application compatible objects that represent the updated set of content objects 119 to the content management platform 125A.

In an embodiment, the content management platform 125A may combine the document objects that make up the currently stored collaborative document with the third-party application compatible objects that represent the updated set of content objects 119 to generate a new version of the collaborative document that includes the updated content received from the preview user interface 134A. The content management platform 125A may use third-party application libraries to compile a new version of the collaborative document. For example, if the collaborative document is a Microsoft Word document, then the content management platform 125A may use Microsoft Word APIs to compile the various XML files and/or other element files that make up a Microsoft Word document.

Upon generating a new version of the collaborative document, the content management platform 125A may store the new version of the collaborative document within the data store 114. In an embodiment, the content management platform 125A may generate a new object, such as a new text document 115, for the new version of the collaborative document or may replace the existing version of the collaborative document with the new version of the collaborative document. In an embodiment, the data store 114 may be configured to manage the multiple versions of the collaborative document.

In an embodiment, the content management platform 125A may be configured to periodically, generate a new version of the collaborative document based upon whether the set of content objects 119 contains new content objects 119 or changes to the existing content objects 119. For example, the content management platform 125A may periodically check for changes to the set of content objects 119 (e.g., every 1, 5, or 10 minutes). Additionally, the content management platform 125A may initiate generation of a new version of the collaborative document upon receiving a new request to preview the collaborative document or a request to download the collaborative document. For example, if preview user interface 134B sends a request for the collaborative document, then the content management platform 125A may initiate generation of an up-to-date version of the collaborative document in order to generate an up-to-date graphical representation of the collaborative document for the preview user interface 134B.

When generating a new version of a collaborative document, the content object processing component 129A may preserve the set of content objects 119 for the collaborative document within the data store 114. Preserving the set of content objects 119 saves computing resources because the content object processing component 129A does not have to repeat the process of extracting data objects and generating corresponding content objects 119 for preview request. In an embodiment, if a collaborator uploads a new version of the collaborative document that may include additional data objects, such as additional comments or annotations, the content management platform 125A may consolidate the additional objects from the newly uploaded collaborative document and the existing set of content objects 119 corresponding to the existing collaborative object. Consolidating the additional data objects and the existing set of content objects 119 may include a process of updating content within the existing set of content objects 119 and deduplication of the existing set of content objects 119.

Figure 3B:
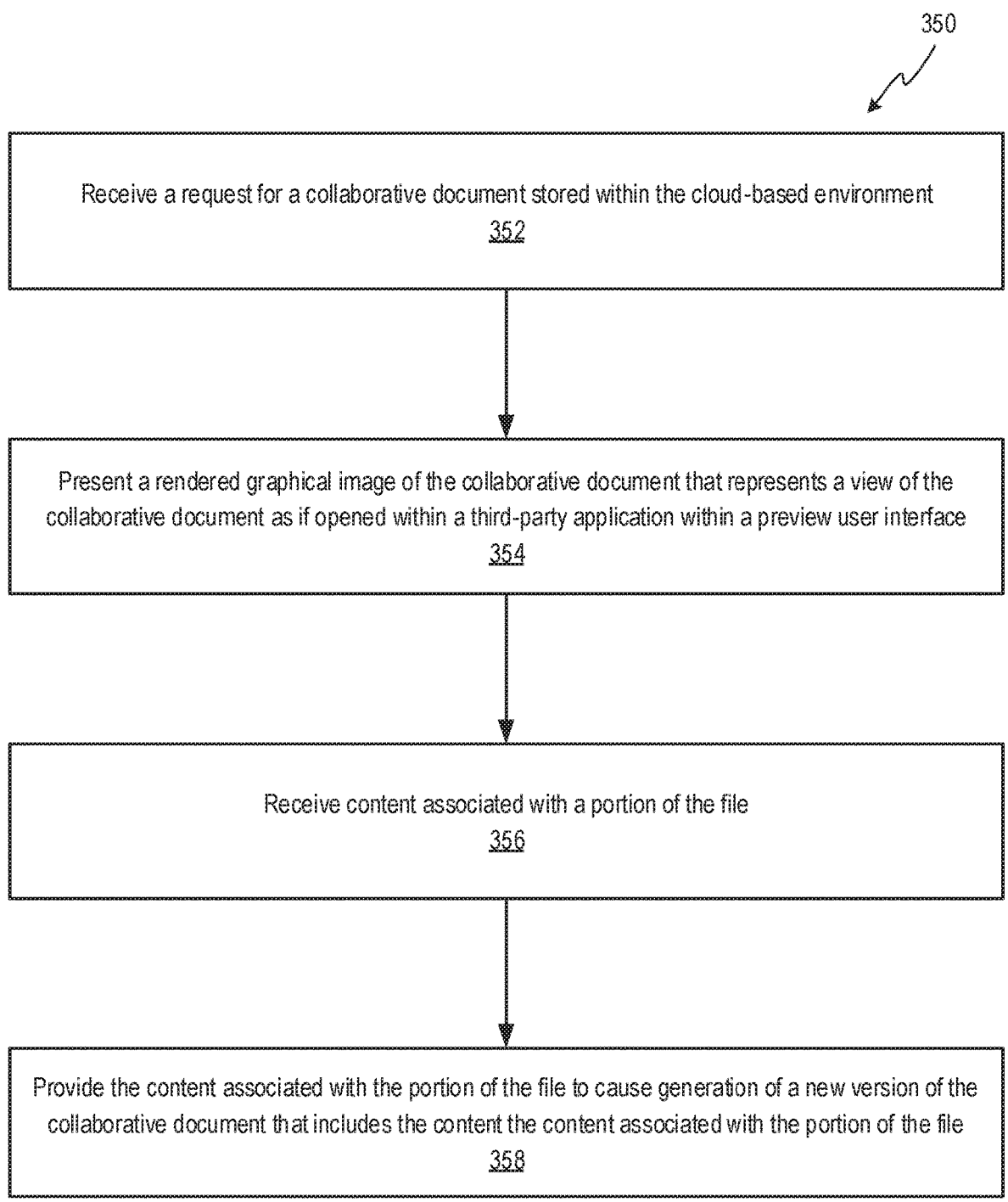
FIG. 3B depicts a flow diagram of a method for providing a preview interface to display a preview of a requested collaborative document and receive content input from a user, and provide the content input to a cloud-based environment to generate a new version of the collaborative document including the content input from the user, in accordance with one implementation of the disclosure.

FIG. 3B depicts a flow diagram of a method 350 for presenting, within the preview user interface 134A, a rendered graphical image of the collaborative document, receiving content input from a user, and providing to the content management platform the content input to cause a new version of the collaborative document to be generated that includes the content input from the user, according to some implementations. Method 350 can be performed by a client application executed by one or more processing devices of the client devices 130A-130Z.

At block 352, the client device 130A may receive a user request for a collaborative document stored within the cloud-based environment 110. The file may represent any stored document including, but not limited to, collaborative slide presentation(s) 113, collaborative text document(s) 115, collaborative spreadsheet(s) 116, collaborative image document 117, or any other collaborative document stored within the data store 114 in a third-party application format. The received user request may be generated within the preview user interface 134A or any other user interface or application on the client device 130A configured to communicate with the content management platform 125A. The client device 130A may send the user request to the content management platform 125A.

In an implementation, the content management platform 125A may send back the collaborative document to the client device 130A. At block 354, the client device 130A may present a rendered graphical image of the collaborative document, which represents a view of the collaborative document as if opened within a third-party application, within the preview user interface 134A. In an implementation, content management platform 125A may send the collaborative document to the client device 130A as a set of one or more document objects and a set of content objects 119 that make up the collaborative document. The client device 130A may be configured to generate, from the one or more document objects, one or more graphical representations of the document objects. The one or more graphical representations may be formatted to look like graphical representations of the document objects as they would appear within the third-party application associated with the collaborative document.

In an implementation, the client device 130A may generate graphical representations of the content objects 119 to look like the objects in the associated third-party application of the collaborative document. For instance, the client device 130A may generate graphical representations of Microsoft Word comments to look like Microsoft Word comments as they would appear within the Microsoft Word application. The client device 130A may combine the graphical representations of document objects and the graphical representations of content objects 119 to generate a rendered graphical image of the collaborative document for viewing within the preview user interface 134A. Alternatively, the rendered graphical image of the collaborative document can be generated by the content management platform 125A and provided to the client device 130A for presentation within the preview user interface 134A.

Referring back to FIG. 3B, at block 356 the client device 130A may receive, via the preview user interface 134A, content associated with a portion of the collaborative document. In an implementation, the client device 130A may generate a corresponding content object 119 that represents the content received. The corresponding content object 119 may be associated with positional coordinates of the collaborative file based upon the positional coordinates of the portion selected when the content was received.

At block 358, the client device 130A may provide the content to the content management platform 125A for generation of a new version of the file that includes the content associated with the portion of the file. In an implementation, the client device 130A may send the content as a new content object 119, which may include the positional coordinates of the associated portion, to the content management platform 125A. The content object 119 may be formatted as to be compatible with the third-party application format of the collaborative file. For example, if the collaborative file is a Microsoft Word document, then the generated new content object 119 may be a Microsoft Word formatted comment object.

In an implementation, the content management platform 125A may receive the content from the client device 130A and may generate a new version of the collaborative file that includes the new content object 119.

Figure 7:
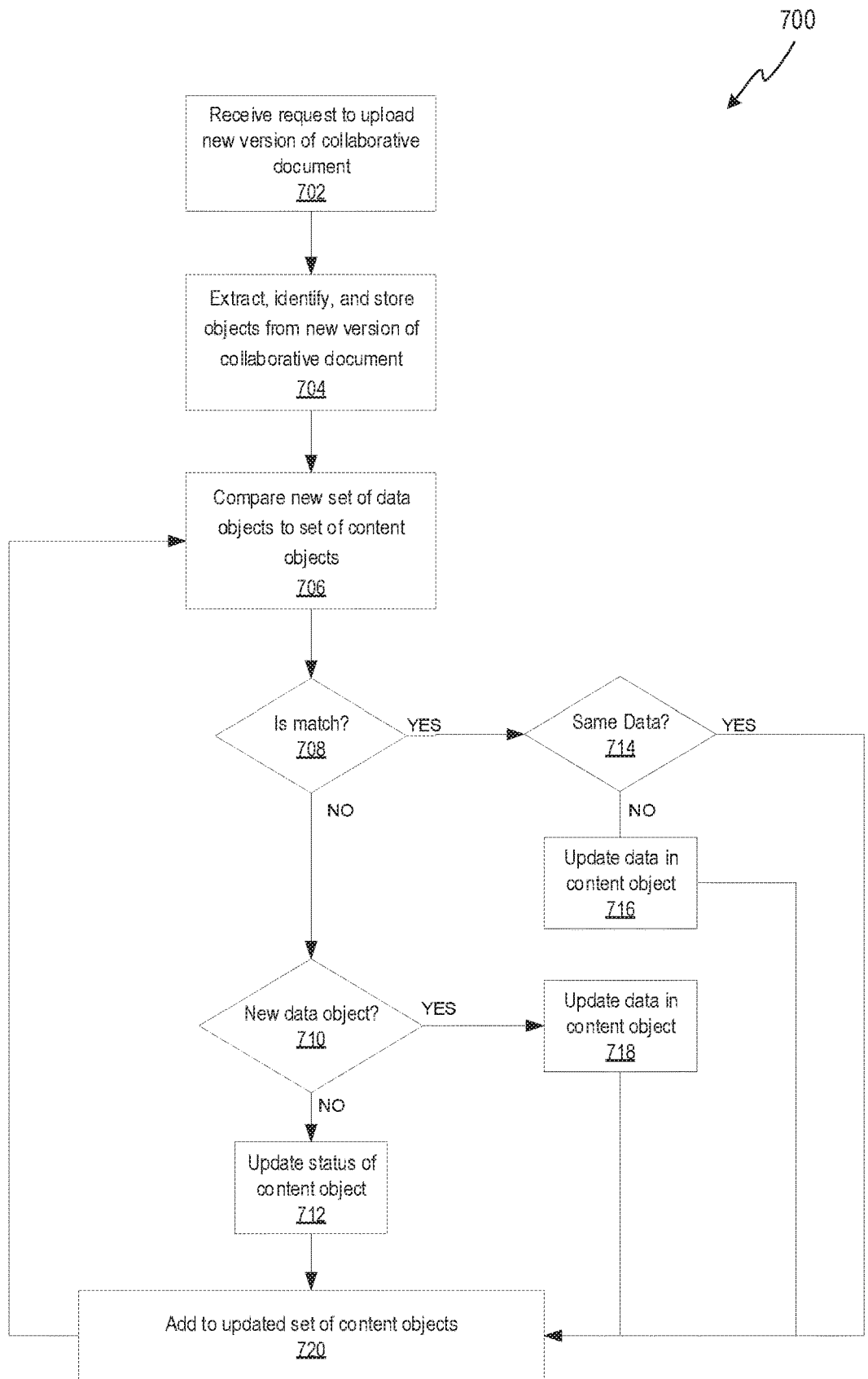
FIG. 7 depicts a flow diagram of a method for updating a set of content objects associated with a collaborative document using a new version of the collaborative document containing new/updated data objects, in accordance with one implementation of the disclosure.

FIG. 7 depicts an example flow diagram for updating the set of content objects 119 using a new collaborative document containing new/updated data objects corresponding to the set of content objects 119, in accordance with some implementations. At block 702, the processing device may receive a request to upload a new version of a collaborative document that has a third-party application format. For example, the cloud-based environment 110 store an existing collaborative document (Microsoft Word document) and the content management platform 125A may receive a new version of the Microsoft Word document that may contain additional or updated content including updated comments. The new version of the collaborative document may be sent by the client device 130A, where a user of the client device 130A may have generated the new version of the collaborative document using a third-party application, such as Microsoft Word or any other compatible third-party application.

At block 704, the processing device may extract and store bytes from the new version of the collaborative document in the data store 114. In an embodiment, the content management platform 125A may send the bytes of the new version of the collaborative document to the document processing component 127A. The document processing component 127A may then extract and identify an updated set of document objects from the new version of the collaborative document. For example, if the collaborative document is a Word document, then the document processing component 127A may use rules specified for a Word document format to identify and store the updated set of document objects. The updated set of document object may be used to generate updated graphical representations of the collaborative document.

In an embodiment, the content management platform 125A may send the bytes of the new version of the collaborative document to the content object processing component 129A to identify the set of data objects that correspond to the existing set of content objects 119. For example, if the set of content objects 119 refer to comments within the collaborative document, then the content object processing component 129A may identify, from the bytes of the new version of the collaborative document, the comments within the new version of the collaborative document. In an embodiment, the document processing component 127A may use rules specific to the third-party application format associated with the new version of the collaborative document to identify the set of data objects.

Once the set of data objects is identified, the processing device may compare the set of data objects from the new version of the collaborative document to the existing set of content objects 119 that correspond to the current version of the collaborative document (block 706). The comparison is performed to update existing content objects 119 with existing content based on the new version of the collaborative document and to generate new content objects 119 that correspond to data objects within the new version of the collaborative document. In an embodiment, the content object processing device 129A may compare the set of data objects from the new version of the collaborative document to the existing set of content objects 119 by determining potential matching objects that may be consolidated by deduplication, using available attributes that exist in both the data objects and the content objects 119.

At block 708, the processing device determines whether there is a match between a data object from the new version of the collaborative document and an existing content object 119. In an embodiment, attributes used to match data objects to existing content objects may include, but are not limited to, a content object identifier, a user ID, text within the data object and content object 119, positional information from the data object and content object 119, any other available attributes, or a combination of multiple attributes.

In one such example, the content object processing component 129A may match a data object to an existing content object using a content object identifier. Each content object 119 contains a unique identifier generated when the content object 119 is first created. The content object identifier may then be exported to the collaborative document when new version of the collaborative document is created by the content management platform 125A. The content object identifier may be embedded into the third-party application format as an invisible attribute that is not implemented by the third-party application. If the data object from the new version of the collaborative document is, for example a comment that was previously managed by the content management platform 125A, then the data object may have a content object identifier to match against the content object identifier in a particular content object 119.

If the data object from the new version of the collaborative document does not contain a content object identifier, then the data object may be compared to a particular content object using the associated user ID of the data object. For example, if the data object is a comment, then the comment may contain an author attribute that may be used to match the data object to a corresponding content object 119. Additionally the text content within a data object may also be used to match the data object to a corresponding content object 119. Other attributes may also be used in combination to determine whether a match exists. For example, the content object processing component 129A may determine a match between the data object and a corresponding content object if the user ID, text within the comment, the timestamp, and associated portion of the document match. The content object processing component 129A may also be configured to partially match attributes. For instance, the user ID, timestamp for the data object and corresponding content object may match but the comment text between the two may only partially match and the positional information may also be different. This may indicate a match but that the data object contains updated text or otherwise has been updated based upon other edits to the collaborative document that changed the positional location of the comment.

If the processing device determines that there is a match, then the processing device proceeds to block 714 to determine whether content within the matching content object 119 needs to be updated. For example, if the content object processing component 129A determines a match but also determines that the text within the comment has changed and/or the positional location of the comment within the collaborative documents has changed then the content object processing component 129A may update the data stored within the content object 119.

At block 716, the processing device updates the data within the content object 119 to reflect the data within the new data object from the new version of the collaborative document. In an embodiment, the content object processing component 129A updates and the content object 119. At block 720, the processing device adds the updated content object 119 to a set of updated content objects 119 that refer to content objects for the new version of the collaborative document. In an embodiment, the content object processing component 129A may save the updated content object 119 and add the updated content object 119 to the set of updated content objects.

Referring back to block 714, if the processing device determines that the data within the new data object and the matching content object 119 is the same, then the processing device proceeds directly to block 720 to add the existing content object 119 to the set of updated content objects 119.

Referring back to block 708, if the processing device determines that there is no match between a data object and the existing content objects 119, then the processing device proceeds to block 710. At block 710, the processing device determines whether the data object is a new data object. For example, the content object processing component 129A may determine that the data object refers to a new comment that was not previously present the current version of the collaborative document. The content object processing component 129A may then proceed to block 718. At block 718, the content object processing component 129A may generate a new content object 119 that refers to the new comment, or other content. The newly generated content object 119 may include each of the attributes from the identified data object such as, user ID, comment text, timestamp, positional information, and any other attribute present in the data object. After generating the new content object 119, the content object processing component 129A may store the new content object 119 within the data store 114 and add the new content object to the new set of content objects 119 (block 720).

If at block 710, the processing device determines that there is no new data objects, but that existing content objects that have not been matched exist, then the processing device proceeds to block 712. At block 712 the processing device updates the status of the current content object 119 to reflect its status within the new version of the collaborative document.

In an embodiment, the content object processing component 129A may be configured to remove associated positional information for the current content object 119 that is not currently present within the new version of the collaborative document. By doing so, the current content object 119 may be displayed within the preview user interface 134A as a "floating" comment. Floating comments may alert a collaborator that the comment was previously deleted without removing its presence from the collaborative document altogether. This feature may prevent accidental deletions of content objects 119 by collaborators that use a third-party application. In another embodiment, content object processing component 129A may update a display attribute within the current content object 119 which when presented within the preview user interface 134A, is displayed differently from the other comments. For example, the current content object may be greyed out or shaded in a different color to indicate that the comment was deleted from the previous version. In yet another embodiment, the content object processing component 129A may delete the current content object from the data store 114. The content object processing component 129A may be configured based upon the collaborative document owner or other collaborators user preferences to handle content objects 119 that have been removed from updated versions of the collaborative document.

At block 720, new or updated content objects 119 are added to the set of updated content objects 119. The processing device then repeats the process at block 706 for each content object and data object to be compared. After the set of updated content objects 119 has been compiled the set of updated content objects 119 is saved within the data store 114 and associated with the new version of the collaborative document for future retrieval when generating a graphical representation of the collaborative for preview within preview user interfaces 134A-134Z or for downloading to client devices 130A-130Z.

Figure 8:
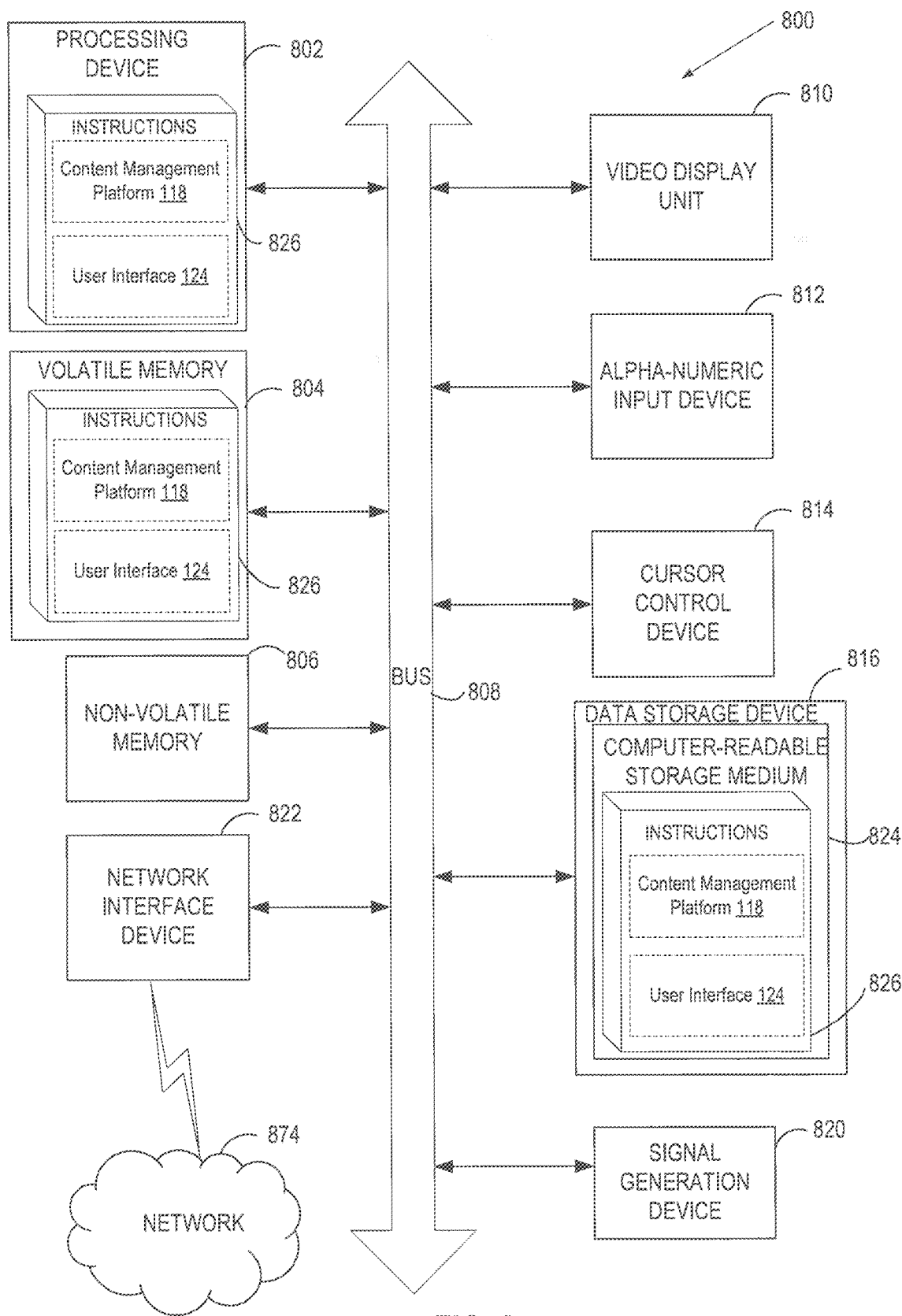
FIG. 8 depicts a block diagram of an example computing system operating in accordance with one or more aspects of the present disclosure.

FIG. 8 depicts a block diagram of an example computing system operating in accordance with one or more aspects of the present disclosure. In various illustrative examples, computer system 800 may correspond to any of the computing devices within system architecture 100 of FIG. 1. In one implementation, the computer system 800 may be each of the servers 130A-130Z. In another implementation, the computer system 800 may be each of the client devices 130A-130Z.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alpha-numeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions implementing the cloud-based content management platform 125 (125A-125Z) and/or the user interface 134 (134A-134Z) of FIG. 1 for implementing the methods described herein.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:
   receiving, by a content management platform, a request for a file stored within the content management platform in a format of a third-party application, wherein the request is received from a client device associated with a user of the content management platform, and wherein the user associated with the client device has permission to access the file;
   generating, by the content management platform, a rendered graphical image of the file based on each of a first plurality of data objects, extracted from the file when the file was stored, and associated with a first version of the file, wherein the rendered graphical image of the file is rendered in view of one or more rendering rules associated with the format of the third-party application to represent a view of the file as if opened within the third-party application, without opening the document in the third-party application;

causing, by the content management platform, the rendered graphical image of the file to be presented within a preview user interface on the client device;

receiving, by the content management platform, a request to add content associated with a corresponding data object of the first plurality of data objects to the file, wherein the content of the request is received via the preview user interface on the client device;

generating, by the content management platform, a content object comprising the content of the request and one or more attributes associated with the content of the request, the one or more attributes comprising positional information describing a portion in the collaborative document that is associated with the content of the request;

generating, by the content management platform, an updated version of the file which includes an updated set of data objects, wherein the updated set of data objects has a corresponding set of content objects including the generated content object, and at least a subset of the data objects in the updated set are based on the first plurality of data objects associated with the first version of the file;

receiving, by the content management platform, a request to store a second version of the file in the format of the third-party application;

comparing, by the content management platform, an updated set of data objects for the second version of the file to a set of content objects corresponding to the first plurality of data objects associated with the first version of the file, the comparing includes at least identifying whether matches exist between the updated set of data objects of the second version and the set of content objects associated with the first version, the comparing being based on (i) content of each data object in the updated set of data objects of the second version and content of each content object in the set of content objects associated with the first version, and (ii) at least one of a user identifier or a timestamp of each data object in the updated set of data objects of the second version and at least one of a user identifier or a timestamp of each content object in the set of content objects associated with the first version; and creating, by the content management platform, a new set of content objects for the second version of the file based on results of the comparing, wherein when the results of the comparing identify unmatched content objects that do not match across the set of content objects associated with the first version and the updated set of data objects of the second version, the new set of content objects of the second version of the collaborative document includes the unmatched content objects that are to be displayed without associated positional information, while positional information associated with other content objects is to be displayed.

2. The method of claim 1, wherein the format of the third-party application is one of a word processing application format, a spreadsheet application format document, a slide presentation application format, a drawings presentation application format, a graphics file, a video file, a 3D rendered file, or a computer-aided design rendered files.

3. The method of claim 1, wherein generating the rendered graphical image of the file comprises:
generating a rendered image of each of the first plurality of data objects associated with the first version of the file based upon the one or more rendering rules associated with the format of the third-party application; and
generating the rendered graphical image of the file from each rendered image of each of the first plurality of data objects, wherein the rendered graphical image of the file that represents the view of the file as if opened within the third-party application.

4. The method of claim 1, wherein the preview user interface on the client device allows the user associated with the client device to perform one or more actions of highlighting text displayed within the rendered graphical image, highlighting a portion of the rendered graphical image using positional coordinates, creating a new comment associated with a portion of the rendered graphical image, and editing an existing comment.

5. The method of claim 1, wherein generating the content object comprises:
associating the content object with the corresponding data object based upon positional coordinates of the corresponding data object within the rendered image of the file.

6. The method of claim 1, further comprising:
receiving a request to preview the second version of the file stored within the content management platform;
generating, a rendered graphical image of the second version of the file that represents a view of the second version of the file as if opened within the third-party application, wherein the rendered graphical image of the second version of the file includes rendered images of the updated content; and
providing, the rendered graphical image of the file for presentation within a preview user interface on the client device.

7. A non-transitory machine-readable storage medium storing instructions which, when executed, cause a processing device to perform operations comprising:
receiving a request for a file stored within a content management platform in a format of a third-party application wherein the request is received from a client device associated with a user of the content management platform, wherein the user associated with the client device has permission to access the file;
generating a rendered graphical image of the file based on each of a first plurality of data objects, extracted from the file when the file was stored, and associated with a first version of the file, wherein the rendered graphical image of the file is rendered in view of one or more rendering rules associated with the format of the third-party application to represent a view of the file as if opened within the third-party application, without opening the document in the third-party application;
causing the rendered graphical image of the file to be presented within a preview user interface on the client device;
receiving a request to add content associated with a corresponding data object of the first plurality of data objects to the file, wherein the content of the request is received via the preview user interface on the client device;

generating a content object comprising the content of the request and one or more attributes associated with the content of the request, the one or more attributes comprising positional information describing a portion in the collaborative document that is associated with the content of the request;

generating an updated version of the file which includes an updated set of data objects, wherein the updated set of data objects has a corresponding set of content objects including the generated content object, and at least a subset of the data objects in the updated set are based on the first plurality of data objects associated with the first version of the file;

receiving a request to store a second version of the file in the format of the third-party application;

comparing an updated set of data objects for the second version of the file to a set of content objects corresponding to the first plurality of data objects associated with the first version of the file, the comparing includes at least identifying whether matches exist between the updated set of data objects of the second version and the set of content objects associated with the first version, the comparing being based on (i) content of each data object in the updated set of data objects of the second version and content of each content object in the set of content objects associated with the first version, and (ii) at least one of a user identifier or a timestamp of each data object in the updated set of data objects of the second version and at least one of a user identifier or a timestamp of each content object in the set of content objects associated with the first version; and creating a new set of content objects for the second version of the file based on results of the comparing, wherein when the results of the comparing identify unmatched content objects that do not match across the set of content objects associated with the first version and the updated set of data objects of the second version, the new set of content objects of the second version of the collaborative document includes the unmatched content objects that are to be displayed without associated positional information, while positional information associated with other content objects is to be displayed.

8. The non-transitory machine-readable storage medium of claim 7, wherein generating the rendered graphical image of the file comprises:

generating a rendered image of each of the first plurality of data objects based upon the one or more rendering rules associated with format of the third-party application; and generating the rendered graphical image of the file from the rendered image of each of the first plurality of data objects, wherein the rendered graphical image of the file that represents the view of the file as if opened within the third-party application.

9. The non-transitory machine-readable storage medium of claim 7, wherein the preview user interface on the client device allows the user associated with the client device to perform one or more actions of highlighting text displayed within the rendered graphical image, highlighting a portion of the rendered graphical image using positional coordinates, creating a new comment associated with a portion of the rendered graphical image, and editing an existing comment.

10. The non-transitory machine-readable storage medium of claim 7, wherein generating the content object comprises:

associating the content object with the corresponding data object based upon positional coordinates of the corresponding data object within the rendered image of the file.

11. The non-transitory machine-readable storage medium of claim 7, comprising additional storage medium instructions, which when executed, further cause the processing device to perform operations comprising:

receiving a request to preview the second version of the file stored within the content management platform;

generating, a rendered graphical image of the second version of the file that represents a view of the second version of the file as if opened within the third-party application, wherein the rendered graphical image of the second version of the file includes rendered images of the updated content; and providing, the rendered graphical image of the file for presentation within a preview user interface on the client device.

12. A system comprising:

a memory; and a processing device operatively coupled with the memory to:

receive a request for a file stored within a content management platform in a format of a third-party application, wherein the request is received from a client device associated with a user of the content management platform, and wherein the user associated with the client device has permission to access the file;

generate a rendered graphical image of the file based on each of a first plurality of data objects, extracted from the file when the file was stored, and associated with a first version of the file, wherein the rendered graphical image of the file is rendered in view of one or more rendering rules associated with the format of the third-party application to represent a view of the file as if opened within the third-party application, without opening the document in the third-party application;

cause the rendered graphical image of the file to be presented within a preview user interface on the client device;

receive a request to add content associated with a corresponding data object of the first plurality of data objects to the file, wherein the content of the request is received via the preview user interface on the client device;

generate a content object comprising the content of the request and one or more attributes associated with the content of the request, the one or more attributes comprising positional information describing a portion in the collaborative document that is associated with the content of the request;

generate an updated version of the file which includes an updated set of data objects, wherein the updated set of data objects has a corresponding set of content objects including the generated content object, and at least a subset of the data objects in the updated set are based on the first plurality of data objects associated with the first version of the file;

receive a request to store a second version of the file in the format of the third-party application;

compare an updated set of data objects for the second version of the file to a set of content objects corresponding to the first plurality of data objects associated with the first version of the file, the comparing includes at least identifying whether matches exist between the updated set of data objects of the second version and the set of content objects associated with the first version, the comparing being based on (i) content of each data object in the updated set of data objects of the second version and content of each content object in the set of content objects associated with the first version, and (ii) at least one of a user identifier or a timestamp of each data object in the updated set of data objects of the second version and at least one of a user identifier or a timestamp of each content object in the set of content objects associated with the first version; and create a new set of content objects for the second version of the file based on results of the comparing, wherein when the results of the comparing identify unmatched content objects that do not match across the set of content objects associated with the first version and the updated set of data objects of the second version, the new set of content objects of the second version of the collaborative document includes the unmatched content objects that are to be displayed without associated positional information, while positional information associated with other content objects is to be displayed.

13. The system of claim 12, wherein to generate the rendered graphical image of the file comprises:

generate a rendered image of each of the first plurality of data objects based upon the one or more rendering rules associated with the format of the third-party application; and generate the rendered graphical image of the file from the each rendered image of each of the first plurality of data objects, wherein the rendered graphical image of the file that represents the view of the file as if opened within the third-party application.

\* \* \* \* \*